United States Patent
Morel et al.

(10) Patent No.: US 12,282,336 B2
(45) Date of Patent: Apr. 22, 2025

(54) MACHINE AND PROCESS FOR ROTATING A VEHICLE

(71) Applicant: The Boeing Company, Arlington, VA (US)

(72) Inventors: Mark R. Morel, Edmonds, WA (US); Neil Zimmer, Orondo, WA (US); Tristan Flanzer, Seattle, WA (US)

(73) Assignee: The Boeing Company, Arlington, VA (US)

( * ) Notice: Subject to any disclaimer, the term of this patent is extended or adjusted under 35 U.S.C. 154(b) by 243 days.

(21) Appl. No.: 18/171,185

(22) Filed: Feb. 17, 2023

(65) Prior Publication Data
US 2024/0280993 A1    Aug. 22, 2024

(51) Int. Cl.
  *G05D 1/08*   (2006.01)
  *B64D 45/00*  (2006.01)
  *G05D 1/00*   (2006.01)

(52) U.S. Cl.
  CPC ........... *G05D 1/0816* (2013.01); *B64D 45/00* (2013.01)

(58) Field of Classification Search
  CPC .. G05D 1/0816; G05D 1/495; G05D 2105/22; G05D 2109/02; B64C 13/00; B64C 19/00; B64C 17/06; B64D 45/00; G01M 1/10; G01M 1/365
  See application file for complete search history.

(56) References Cited

U.S. PATENT DOCUMENTS

| | | | | |
|---|---|---|---|---|
| 4,545,019 A | * | 10/1985 | Glover | G01M 1/127 73/65.06 |
| 5,136,513 A | * | 8/1992 | Sol | B60T 8/266 701/124 |
| 9,651,948 B2 | | 5/2017 | Wilson et al. | |
| 9,989,972 B2 | | 6/2018 | Eggold et al. | |
| 10,479,481 B2 | | 11/2019 | Beaufrere | |
| 10,739,139 B1 | * | 8/2020 | LeGrand, III | G01M 1/10 |
| 2003/0205644 A1 | | 11/2003 | Najmabadi et al. | |
| 2009/0177340 A1 | | 7/2009 | Ishiba | |
| 2019/0302804 A1 | * | 10/2019 | Elshafei | G01C 21/18 |
| 2020/0148345 A1 | * | 5/2020 | Wittmaak, Jr. | B64U 10/20 |
| 2021/0053670 A1 | | 2/2021 | Landry | |

(Continued)

FOREIGN PATENT DOCUMENTS

JP     6585673 B2     9/2019
WO  WO-2022208274 A2  * 10/2022

OTHER PUBLICATIONS

KR 20200008810 A with English translation; date filed Jul. 17, 2018; date published Jan. 29, 2020. (Year: 2020).*

(Continued)

*Primary Examiner* — Calvin Cheung
(74) *Attorney, Agent, or Firm* — Yee & Associates, P.C.

(57) ABSTRACT

A machine and process for control of rotation of a vehicle about an axis of the vehicle is shown. A flight control system includes control laws that control the rotation of the vehicle around the axis of the vehicle. An estimate is derived for an inertia about the axis. The estimated inertia is derived from sensed quantities of material in a component of the vehicle. An inertia gain schedule and filter are added to enhance, using the estimated inertia, the accuracy of the control laws that control the rotation of the vehicle around the axis of the vehicle.

20 Claims, 9 Drawing Sheets

(56) References Cited

U.S. PATENT DOCUMENTS

2021/0072769 A1    3/2021  Flanzer et al.
2022/0024589 A1*   1/2022  Karni ..................... B64C 39/02

OTHER PUBLICATIONS

KR 20160073052 A with English translation; date filed Dec. 16, 2014; date published Jun. 24, 2016. (Year: 2016).*
KR 20120057162 A with English translation; date filed Nov. 26, 2010; date published Jun. 5, 2012. (Year: 2012).*
JP 2007271392 A with English translation; date filed Mar. 30, 2006; date published Oct. 18, 2007. (Year: 2007).*
Extended European Search Report, dated Jun. 17, 2024, regarding EP Application No. 24151966.9, 9 pages.

* cited by examiner

MACHINE AND PROCESS FOR ROTATING A VEHICLE

BACKGROUND INFORMATION

1. Field

The present disclosure relates generally to control of rotation of a vehicle about an axis of the vehicle. Further, the present disclosure relates to the effects of the rotation of the vehicle about the axis of the vehicle at least on maneuverability, stability, structural loading, and resultant structural property requirements of the vehicle. The present disclosure relates more specifically to a roll control of a winged vehicle and enhancement of maneuverability, stability, structural loading, and resultant structural property requirements of the winged vehicle.

2. Background

Rotation of a vehicle about an axis of the vehicle results in loads on structural components, offset from the axis, of the vehicle. To ensure reliability of the structural components of the vehicle, properties of the structural components must be designed and manufactured to accommodate the predicted loads on the structural components and/or the predicted loads multiplied by some factor that precludes a structural deformity and/or fracture if the predicted loads are exceeded in operation of the vehicle.

Generally, for any given material forming a structural component, to increase a strength and durability of the structural component, a greater amount of the material, and hence a greater weight of the material are required.

Generally, if a wing of an aircraft is going to be exposed to greater loads, then to withstand the greater loads, the materials of the wing must be strengthened or the dimensions of the structural components of the wing must be increased. When dimensions of the structural components of the wing must be increased, or denser materials are required, the weight of the structural components and the wing will increase.

Therefore, it would be desirable to have a method and apparatus that take into account at least some of the issues discussed above, as well as other possible issues. For example, it would be desirable to have a process and a machine to precisely control roll of a vehicle about an axis of the vehicle, and enhance maneuverability, stability, structural loading, and resultant structural property requirements of the vehicle.

SUMMARY

An embodiment of the present disclosure provides a process for estimating an inertia for controlling rotation of a vehicle about an axis of the vehicle. That process includes: receiving, from a sensor for the vehicle, a quantity of a material retained within a component of the vehicle; deriving a value of a weight of the quantity of the material retained within the component; assigning a first location to a center of a gravity for the vehicle less the weight of the quantity of the material retained within the component of the vehicle; deriving an inertia value about the axis of the vehicle less the weight of the quantity of the material retained within the component of the vehicle; assigning a second location to a center of gravity of the material retained within the component; estimating an inertia value about the axis for the weight of the material retained within the component. The inertia value for rotating the vehicle about the axis may be estimated by combining: the inertia value about the axis of the weight of the quantity of the material retained within the component; and the inertia value about the axis of the vehicle less the weight of the quantity of the material retained within the component of the vehicle. The process for estimating an inertia for controlling rotation of a vehicle about an axis of the vehicle also includes providing an estimate of the inertia value for rotating the vehicle about the axis to a rotation control.

For the process for estimating an inertia for controlling rotation of a vehicle about an axis of the vehicle, the material retained within the component of the vehicle may be a fluid. The quantity and the weight of the material retained within the component of the vehicle may vary during operation of the vehicle. The axis in the process for estimating an inertia for controlling rotation of a vehicle about an axis of the vehicle may be an X axis of the vehicle.

For the process for estimating an inertia for controlling rotation of a vehicle about an axis of the vehicle, the first location for estimating an inertia for controlling rotation of a vehicle about an axis of the vehicle may be defined by a distance from an X axis of the vehicle at a distance along a Y axis of the vehicle and at a distance along a Z axis of the vehicle. The process may further include assigning, using the quantity of the material sensed by the sensor, a current weight of the material retained within the component. The component may be a fuel tank in the vehicle.

The process for estimating an inertia for controlling rotation of a vehicle about an axis of the vehicle may further include: the vehicle including the rotation control including rotation control laws; and adding a gain schedule using an estimate of inertia about an X axis of the vehicle to the rotation control laws. The process may further include: the vehicle including a rotation control that includes rotation control laws; and adding a filter using an estimate of inertia about an X axis of the vehicle to the rotation control laws. The material may be fuel for the vehicle. The vehicle may be an aircraft.

An embodiment of the present disclosure also provides a process for controlling a rotation of a vehicle. That process includes: receiving, from a sensor for the vehicle, a quantity of a material retained within a component of the vehicle; deriving a weight of the quantity of the material retained within the component; assigning a first location to a center of a gravity of the vehicle less the weight of the quantity of the material retained within the component of the vehicle; deriving an inertia value of the vehicle less the weight of the quantity of the material retained within the component of the vehicle about an axis of the vehicle; assigning a second location to a center of gravity of the material retained within the component; estimating an inertia value about the axis for the weight of the material retained within the component; estimating an inertia value for rotating the vehicle about the axis by combining the inertia value of the weight of the quantity of the material retained within the component about the axis and the inertia value of the weight of the vehicle less the weight of the quantity of the material retained within the component of the vehicle about the axis; adding a gain schedule using an estimated inertia about the axis of the vehicle to rotation control laws in a rotation control system of the vehicle; and controlling, using the gain schedule using the estimated inertia about the axis of the vehicle and a state of the vehicle, the rotation of the vehicle about the axis. The material retained within the component of the vehicle may be a fluid. The axis may be an X axis of the vehicle. The first location may be defined by a distance from an X axis of the vehicle at a distance along a Y axis of the vehicle and at a distance along a Z axis of the vehicle.

The process for controlling a rotation of a vehicle, may, further include assigning, using the quantity of the material sensed by the sensor, a current weight of the material retained within the component. The component may be a fuel tank in the vehicle. The process may further include adding a filter using inertia about an X axis of the vehicle to the rotation control laws. A quantity and the weight of the material retained within the component of the vehicle may vary during operation of the vehicle.

An embodiment of the present disclosure also provides a machine, configured to control a rotation of a vehicle about an axis of the vehicle, that includes: a rotation control that includes rotation control laws configured to control the rotation of the vehicle about the axis of the vehicle; a sensor system configured to: detect a quantity of a material in a component of the vehicle configured to retain the material; transmit the quantity of the material in the component to the rotation control; sense a state of the vehicle; and transmit the state of the vehicle to the rotation control. The machine may also include flight control electronics configured to: derive a value of a weight of the material in the component; estimate an inertia value of the material in the component about the axis of the vehicle; generate an estimated inertia value for rotating the vehicle about the axis based upon a combination of the inertia value of the weight of the quantity of the material retained within the component about the axis and the inertia value of the weight of the vehicle less the weight of the quantity of the material retained within the component of the vehicle about the axis; input the estimated inertia value about the axis of the vehicle into a gain schedule for rotation control laws in the rotation control of the vehicle; and control, based upon the gain schedule and the estimated inertia value about the axis of the vehicle, a rotation of the vehicle about the axis.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
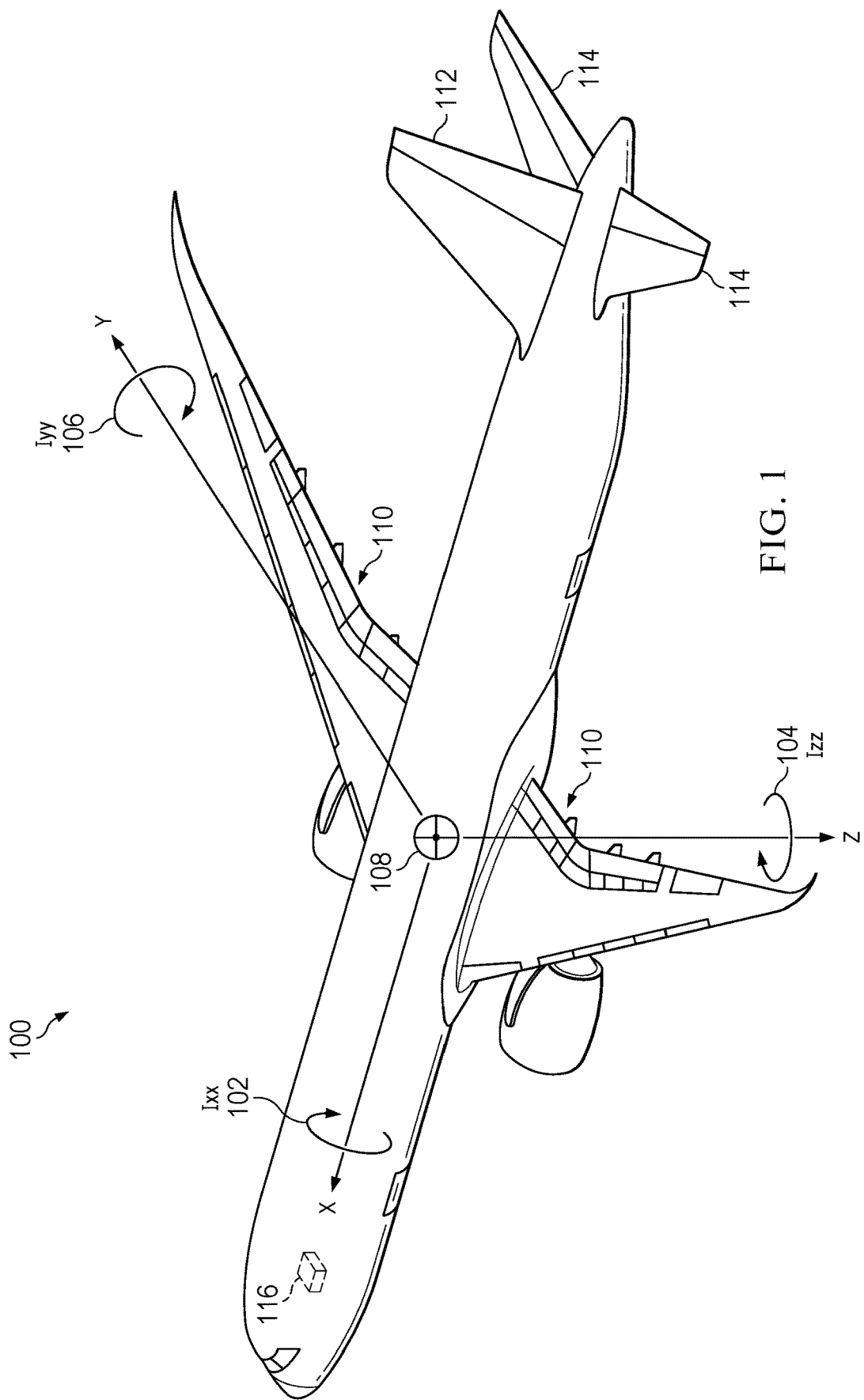
FIG. 1 is an illustration of rotational axes of a vehicle is depicted in accordance with an illustrative embodiment.

The illustrative embodiments recognize and take into account one or more different considerations. For example, one of ordinary skill in the art recognize that many factors affect vehicle rotation about an axis of the vehicle. Control of rotation of the vehicle is a product of desired performance, design, structural, and/or manufacturing choices with often competing requirements of maneuverability and stability.

The illustrative embodiments recognize and take into account that design, manufacturing, and operational considerations in operation of a vehicle involve choices in materials, structures, shapes, and interactive dynamics between a vehicle and a known and/or anticipated operating environment. Different desired or required performance outcomes with regard to strength, reliability, accuracy, maneuverability, controllability, as well as other performance characteristics will affect choices and elements of design, materials, structures and control systems for a vehicle.

Further, without limitation, for at least transport class aircraft, regulatory requirements may also exist. As a non-limiting example, title 14 of the Code of Federal Regulations Part 25 details airworthiness standard for transport category aircraft. As a non-limiting example, and without limitation, Part 25 includes standards for at least: directional and lateral control in 25.147, dynamic stability in 25.181, directional stability and control under in 25.233, vibration and buffeting in 25.251, loads in 25.301, strength and deformation in 25.305, symmetric maneuvering conditions in 25.331, flight maneuvering envelope in 25.333, limit maneuvering load factors in 25.337, rolling conditions in 25.349, control system loads in 25.397, materials in 25.603, aeroelastic stability requirements in 25.629, fuel tanks, 25.963, and numerous other standards.

Similarly, the European Aircraft Safety Agency (EASA) has Certification Standards (CS) that specify many requirements for without limitation, strength, stability, and maneuverability, for aircraft. As a non-limiting example, for large airplanes EASA CS-25 prescribes the airworthiness standards corresponding to 14 CFR part 25 for transport category airplanes. EASA standards may in some cases have requirements that differ from those of US 14 CFR part 25, and/or are in addition to those of US 14 CFR part 25. Without limitation, CS-25 standards include Interaction of systems and structures in CS-25.302.

Vehicle designers determine an ideal performance for numerous aspects of operation of the vehicle in order to comply with all required regulations, and to meet or exceed desired operational capabilities for the vehicle. Such factors help designers determine an ideal rate of rotation about an axis throughout a range of operating conditions for the vehicle. As used herein, the term ideal indicates a value or characteristic desired by a designer of the vehicle. An ideal value or characteristic hence, may represent a designed target for performance that may be based without limitation, upon at least a combination of and/or tradeoff between qualities of reliability, consistency, maneuverability, and/or stability for the vehicle and/or a component thereof. In other words, and ideal may represent a design preference.

The illustrative embodiments recognize and take into account that, as with any machine/vehicle, actual performance may vary from design parameters or theoretical ideals. In operation, variances in inputs and dynamic interactions among inputs, components, and outputs result in the technical problem of variances in actual performance of the machine/vehicle from a design or theoretical ideal. Thus, the illustrative embodiments recognize and take into account that it is desirable to minimize the uncertainty or variance in any of the in inputs and dynamic interactions among inputs, components, and outputs that affect the actual maneuverability and stability of the vehicle in operation.

The illustrative embodiments recognize and take into account that inertia about an axis will affect rotation characteristics and performance about that axis. Control laws that do not account for variations in inertia may result in actual rotation characteristics and performance that vary from expected or desired (ideal) rotation characteristics and performance if actual inertia values about the axis vary throughout operation of a vehicle.

As a non-limiting example of such uncertainty, to control rotation of an aircraft about an axis of the aircraft, air data and inputs thereof used to schedule gains in a control law in a control system commanding the rotation may be uncertain. The data may be uncertain for various reasons, such as without limitation, mechanical errors or unpredicted aerodynamic or atmospheric interactions and/or effects. The aerodynamic control and stability derivatives used in the design of the control law may have margins of error or variance (modeling based data may be imperfect). Predicted or actual structural mode dynamics for the vehicle may present uncertainty. Degraded modes of physical components, control systems, and/or control processing code and/or performance may also introduce some uncertainty into actual maneuverability and stability of the aircraft rotating about an axis of the aircraft.

Thus, one of ordinary skill in the art recognizes that the more precise or optimized measurement or control of each variable that affects a desired performance is, the more robust the overall performance of the vehicle will be with regard to providing acceptable maneuverability and stability in the face of operational uncertainty of any other particular variable or variables. Therefore, the illustrative embodiments recognize and take into account that in controlling rotation of a vehicle about an axis of the vehicle, having a rotation control system with more precise command of flight control position and movements based upon more precise knowledge of a state of a vehicle, including without limitation an inertia about an axis of the vehicle, will produce rotation control that is more robust in handling any other uncertainty of degraded operational inputs that might vary the rotation of the vehicle from an ideal rotation.

The illustrative embodiments recognize and take into account that a novel technical solution to making rotation control of a vehicle about an axis more precise is to incorporate a gain scheduling into the rotation control laws of an estimated inertia about the axis. Hence, the novel generation of an inertia estimated gain scheduling in rotation control laws for the vehicle is made possible by a novel process and machine for inertia estimation for the control laws that provide more precise and thus less uncertain control over actual rotation of the vehicle, and therefore a technical solution that provides a roll control system that is more robust to enduring uncertainties or degradations from other factors affecting actual rotation of the vehicle in operation without exceeding performance limits for maneuverability and stability of the vehicle.

As used herein, a "number of" when used with reference items means one or more items. For example, "a number of different forms" indicates one or more forms.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

With reference now to the figures in particular with reference to FIG. 1, an illustration of rotational axes of a vehicle is depicted in accordance with an illustrative embodiment. X axis, Y axis, and Z axis are shown for vehicle 100. As illustrated at least in FIG. 1, without limitation, vehicle 100 may be an aircraft. For aircraft/vehicle 100, the X axis may be called a longitudinal or roll axis of aircraft 100. For aircraft/vehicle 100, the Y axis may be called a lateral or pitch axis. For aircraft/vehicle 100, the Z axis may be called a vertical or yaw axis.

Inertia of vehicle 100 may be measured about axes X, Z, and/or Y as indicated by Ixx 102, Izz 104, or Iyy 106. Each axes may be a body centered axis, such that axis X may pass through a geometric center of a fuselage of vehicle 100 at centroid 108 as marked in FIG. 1.

One of ordinary skill in the art recognizes that when vehicle 100 is an aircraft, vehicle 100 may have wings that may have flight control devices 110. One of ordinary skill in the art also is aware that defections and/or extensions or retractions of flight control devices 110 may cause rotation of vehicle 100 about any of axes X, Y, and/or Z. One of ordinary skill in the art also is aware that flight control devices 110 on a wing may include, without limitation, flaps, ailerons, ailevatorons (see Boeing U.S. Pat. No. 10,479,481) and/or spoilers, and/or other wing flow control systems and/or devices.

Similarly, when without limitation, vehicle 100 is an aircraft, vehicle 100 may have rudders 112 and elevators 114 and/or other yaw and pitch control systems and/or devices, such as without limitation, a moveable horizontal stabilizer, canards, thrust vector controls, and/or other devices. Vehicle 100 may have Flight Control Electronics (FCE) 116 as part of a flight control system configured to control operation of flight controls of vehicle 100 to include without limitation, rotation of vehicle 100 around any of axes X, Y, and/or Z.

As further shown below, FCE 116 may include a computer system that may include a processor that may include flight control laws that control rotation of vehicle 100. The computer system can be implemented in software, hardware, firmware or a combination thereof. When software is used, the operations performed by the computer system can be implemented in program code configured to run on hardware, such as a processor unit. When firmware is used, the operations performed by the computer system can be implemented in program code and data and stored in persistent memory to run on a processor unit. When hardware is employed, the hardware can include circuits that operate to perform the operations controlled by the computer system of FCE 116.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

The computer system may be a physical hardware system and includes one or more data processing systems. When more than one data processing system is present in the computer system, those data processing systems are in communication with each other using a communications medium. The communications medium can be a network. The data processing systems can be selected from at least one of a computer, a server computer, a tablet computer, or some other suitable data processing system.

The computer system may include a number of processor units that are capable of executing program instructions implementing processes in the illustrative examples. As used herein a processor unit in the number of processor units is a hardware device and is comprised of hardware circuits such as those on an integrated circuit that respond and process instructions and program code that operate a computer. When a number of processor units execute program instructions for a process, the number of processor units is one or more processor units that can be on the same computer or on different computers. In other words, the process can be distributed between processor units on the same or different computers in a computer system. Further, the number of processor units can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit. Hence, one of ordinary skill in the art understands that as described herein, FCE 116 for vehicle 100 is representative of not just a flight control system of an aircraft, but more generally may be applied to a motion control system for a vehicle.

Figure 2:
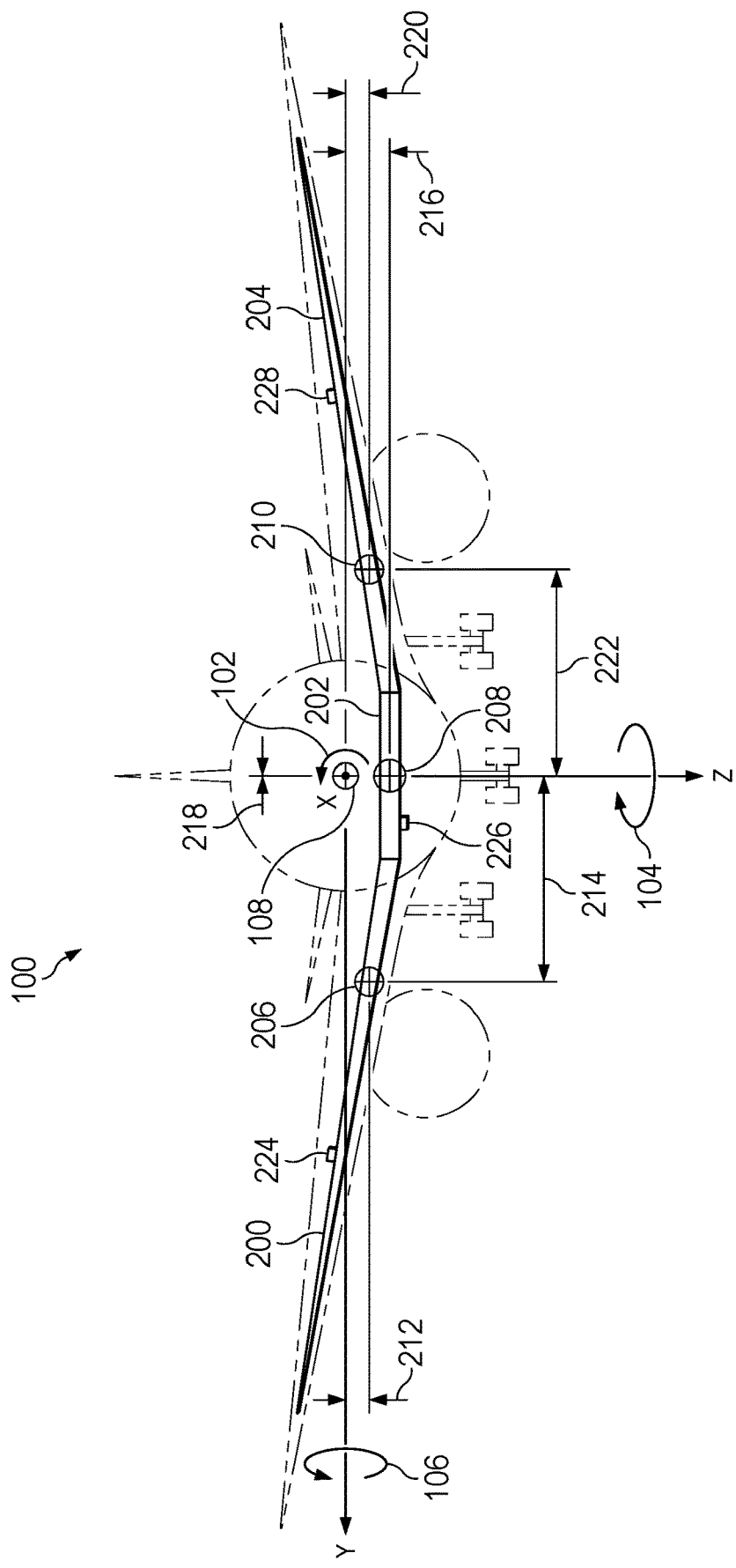
FIG. 2 is an illustration of a cross section view of a vehicle in accordance with an illustrative embodiment.

Looking now at FIG. 2, a cross section view of a vehicle is shown in accordance with an illustrative embodiment. Vehicle 100 is shown with right component 200, center component 202, and left component 204. Each component on vehicle 100 may be a compartment designed and formed to contain some material. A material within each component may have some known density. An amount of the material within each component may be variable during operation of vehicle 100. Without limitation, the material within each component 200-204 may be consumed, discharged, and/or replenished during operation of the vehicle.

Without limitation, the material within each component, when vehicle 100 is an aircraft as shown in FIGS. 1 and 2, for components 200-204 may be fuel. Hence, without limitation, components 200-204 may be fuel tanks for vehicle 100. Each component and the material it retains may have a respective center of mass, located as indicated by dowel pins 206-210. One of ordinary skill in the art recognizes that as the amount of material in a component changes, that a location of the center of mass for that component and its contents will change as well.

Further still, one of ordinary skill in the art recognizes that a respective location of each center of mass 206-210 may be defined by a distance from a from a single axis along each of the two remaining axes. Herein, center of mass may also be considered as a center of gravity. Thus without limitation, as shown, center of mass 206 for right component 200 may be located by a distance 212 from axis X along axis Y and a distance 214 from axis X along axis Z. Likewise, without limitation, center of mass 208 for component 202 may be located by a distance 216 from axis X along axis Y and a distance 218 from axis X along axis Z. Likewise, without limitation, center of mass 210 for component 204 may be located by a distance 220 from axis X along axis Z and a distance 222 from axis X along axis Y.

One of ordinary skill in the art will recognize that a location of a center of mass for a component containing material whose quantity changes will change as the quantity of the material changes. For a given density of material, and given fixed dimensions of a component that retains the material, lookup tables may provide coordinates for the location of the center of mass when a quantity of the material in the component is properly sensed. Hence, each component 200-204 has a respective sensor system 224-228 as shown in FIG. 2 configured to sense a quantity of material retained within the respective component.

When vehicle 100 is an aircraft, one of ordinary skill in the art understands that aircraft dynamics for stability and maneuverability are strongly influenced by the inertial properties of the aircraft that can change significantly for different weight distributions of the aircraft. Inertia is a mass property that indicates an object/vehicle's resistance to rotational acceleration about an axis of rotation of the object/axis. Moments of inertia are fundamental terms in the rigid body equations of motion for at least an aircraft.

The illustrative embodiments recognize and take into account that whereas certain components of a vehicle may have a mass and a displacement from an axis that affect inertia values about that axis, when a weight of those components is fixed, their impact on control laws in control systems to control rotation about that axis are more easily accounted for in the actual maneuverability and controllability of the vehicle, and in particular of rotation about that axis, as compared to components whose mass changes, or that retain a material whose mass changes during operation of the vehicle.

A payload of the aircraft, and a fuel loading in each fuel tank of the aircraft may significantly change the inertial properties of the aircraft. Payloads that can shift position or mass during operation of the vehicle, or be discharged from the vehicle may significantly change the inertial properties of the vehicle. Typically, when the vehicle is a transport aircraft, fuel is loaded into the wing tanks first (in equal amounts), followed by the center tanks, and is consumed in a reversed order during flight. As a non-limiting example, a rolling moment of inertia, such as Ixx 102 shown in FIG. 1, is defined as the aircraft's/vehicle 100 resistance to rotational acceleration about roll axis X.

One of ordinary skill in the art recognizes that for a conventional winged commercial aircraft, that, due to the variable mass and distance to the aircraft centerline a rolling moment of inertia, Ixx, is dominated by a mass of fuel quantity retained in the wings' main fuel tanks. Because the center of mass for a center tank fuel quantity is much closer to axis X than the center of mass is for each wing fuel tank, the center tank has an observable impact on a value for Ixx for the aircraft/vehicle 100 that is much less significant the impact on Ixx produced by fuel quantity in wing tanks further offset from the axis X.

Figure 3:
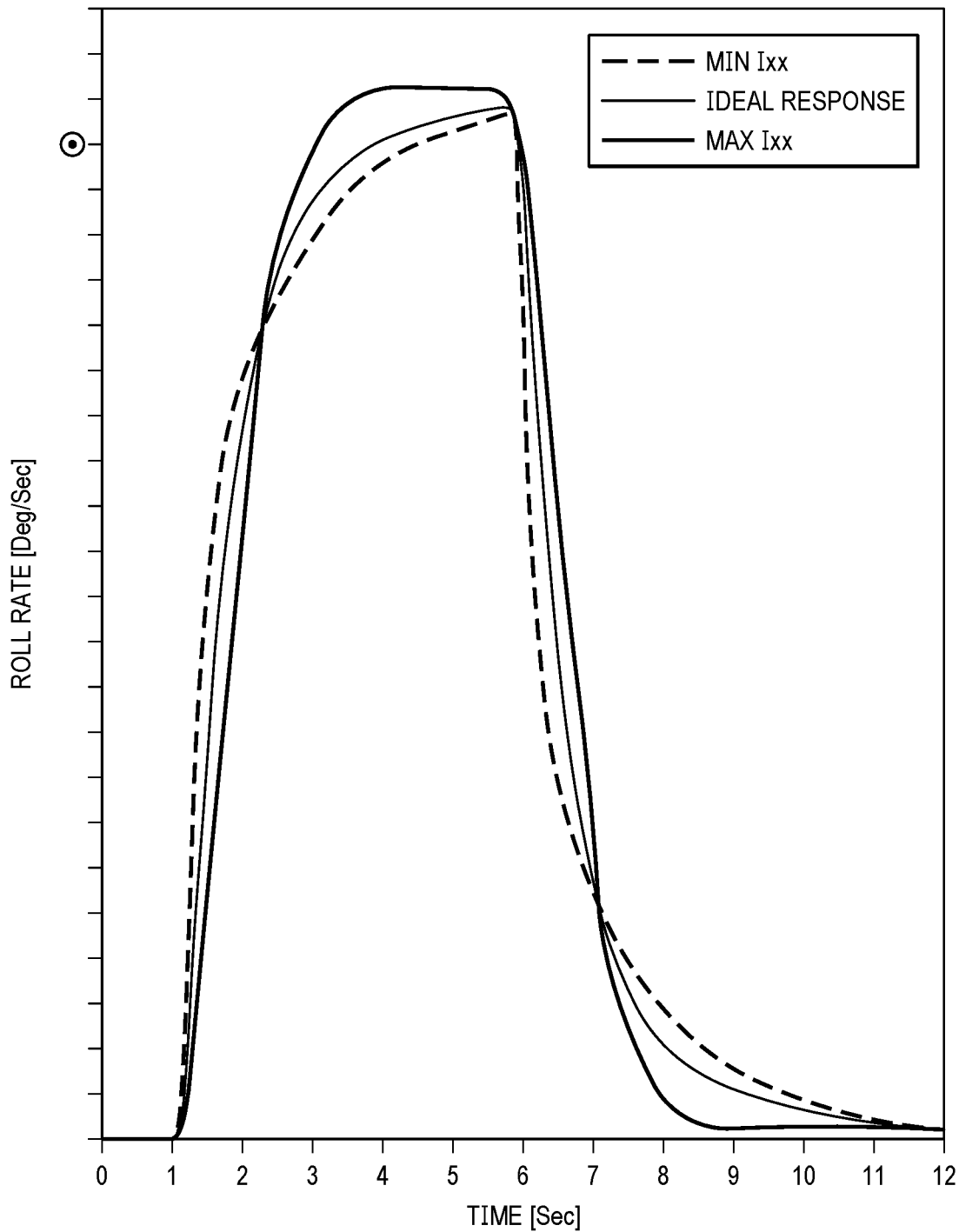
FIG. 3 is an illustration of a plot of roll performance for a vehicle using a current roll control system in accordance with an illustrative embodiment.

Turning to FIG. 3, an illustration of a plot of roll performance for a vehicle using a current roll control system in accordance with an illustrative embodiment. The plots in FIG. 3 are illustrative of normalizing a piloted roll response across a range of roll inertia mass properties. Differences of actual roll rates of a current aircraft (that does not use the novel process and machine embodied herein that uses inertia values in gain scheduling rotation control commands) from an ideal roll rate are depicted for different inertia values.

Specifically, FIG. 3 shows a design intended/ideal roll rate for a roll control system for a vehicle such as without limitation, vehicle 100 shown in FIGS. 1 and 2. The ideal roll rate shown is roll rate performance intended by the vehicle designers for an aircraft in a given configuration at a given speed and altitude, and with a set deflection of control surfaces to produce the ideal roll rate using a machine and process that currently exists to control roll of an aircraft. The ideal roll rate is a target roll rate that meets the design criteria without variances.

Figure 4:
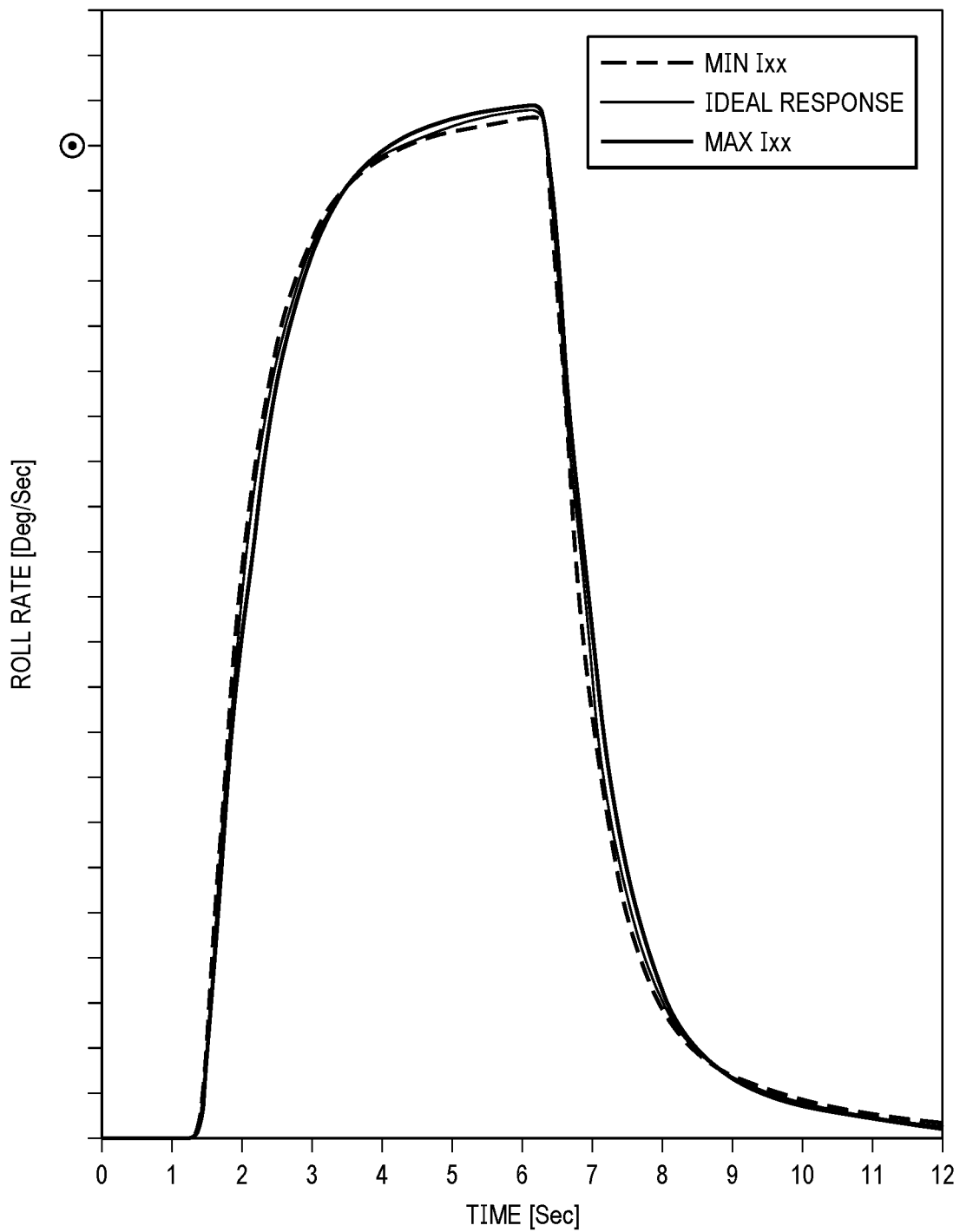
FIG. 4 is an illustration of a plot of roll performance for a vehicle using a novel roll control system in accordance with an illustrative embodiment.

One of ordinary skill in the art recognizes that numerous flight tests for many different combinations of configuration, speed, and altitude, and set deflection of control surfaces to produce the ideal roll using a machine and process that currently exists to control roll of an aircraft may be flown to produce plots such as shown in FIG. 3. Without reproducing the results in this application of the many flight tests completed, the trend of their results are represented by FIG. 3. For proprietary reasons, the scale values in FIGS. 3-4 are not precise values from design and obtained in flight test, but are representative of trends and overshoots and undershoots found in analysis for flight of a production transport aircraft. What is notable is that, with currently existing flight control systems, flight test roll rate trends across many conditions results in a spread of values that deviate from the ideal roll rate, as represented in FIG. 3.

In addition to the ideal roll rate shown in FIG. 3 are representations of actual test results of roll rate of a transport aircraft similar to vehicle 100 shown in FIGS. 1 and 2 rotating about axis X in a given configuration at a given speed and altitude, and with a set deflection of control surfaces to produce the ideal roll rate using a machine and process that currently exists to control roll of an aircraft. The bold line shows variances in actual roll rate from the ideal for a maximum operational Ixx condition, and a dashed line shows variances in actual roll performance from the ideal for a minimum operational Ixx condition. Notably, (and to be contrasted below with the performance of the same vehicle using the process and machine of the embodiments described herein) the actual roll performance varies from the ideal.

One of ordinary skill in the art understands that during operation of an aircraft, that bending moments across a wingspan of the aircraft vary, and that at any point along a wingspan, that bending moments loading the wing increase as the roll rate of the aircraft increases. Thus, when a roll rate is increased by, without limitation, two degrees per second, the wing loading and bending moment may increase at points along the wingspan to close to 1.4%. A roll rate increase of just 1 degree per second can increase loading and a wing bending moment at points along the wingspan by close to 0.7 percent. A roll rate increase of three degrees per second can increase loading and a wing bending moment at points along the wingspan by close to two percent. As indicated by FIG. 3, actual rotation/roll performance with current rotation control systems has a range that deviates from ideal design values across a range of Ixx values. One of ordinary skill in the art recognize that structural load design requirements for components of the aircraft are determined by the limits expected for the operational envelope of the vehicle, plus some determined margin. Hence, as a non-limiting example, if a desired roll rate is expected, but due to system performance variance, an actual rate of two degrees per second greater may be expected, then the structures of the vehicle will require configurations able to handle the increased loads generated by the higher roll rate. One of ordinary skill in the art understands that absent new materials, to handle a higher load, a given structure normally requires increased dimensions or reinforcements that will result in a weight for the given structure carrying the load being heavier.

It follows that, if expected loads on a structure are lowered, then the design and manufacture requirements of the structure may be less substantial. In other words, the structure may be smaller, thinner, and/or lighter when expected loads are lower due to expected/design roll rates being lowered. The novel process and machine embodied herein provide the technical improvement over existing rotation control systems of significantly reducing the variances in actual roll performance from the ideal performance. Hence, the novel process and machine embodied herein provide the technical improvement over existing rotation control systems of measurably reducing a strength and/or weight of load carrying structures of the vehicle, and hence of the vehicle itself.

One of ordinary skill in the art recognizes as well, that reducing a weight of a vehicle improves fuel efficiency and other characteristics of the vehicle. As a non-limiting example, for a given aircraft design, a lower weight may improve acceleration, climb, operating ceiling, and/or other maneuverability and/or stability characteristics of the aircraft.

Hence, without limitation, novel flight control system described herein produces the novel technical improvement of reducing, compared to existing flight control systems, variances in actual rotation rate of a vehicle about an axis. Specifically, the increase in accuracy of actual rotation rate versus ideal rotation rate is shown in FIG. 4 as compared to FIG. 3.

As with FIG. 3, FIG. 4 shows differences of actual roll rate at different Ixx inertial values (as a non-limiting example, resultant from different weights of material in components 200-204) for an aircraft in a given configuration from the same ideal roll rate of FIG. 3. The novel flight control system 600 design, and primary control laws 622 provide the novel technological advantage of enhancing adherence of actual rotation performance of vehicle 100 that has nearly no deviation from the desired ideal roll rate.

Specifically, FIG. 4 shows the same design intended ideal roll rate for a roll control system as shown in FIG. 3 for a vehicle such as without limitation, vehicle 100 shown in FIGS. 1 and 2. The ideal roll rate shown is a target roll rate performance intended by the vehicle designers for the aircraft in the given configuration at a given speed and altitude, and with a set deflection of control surfaces to produce the ideal roll rate as shown in FIG. 3 without variances, but using the novel machine and process embodied herein, to control roll of an aircraft.

One of ordinary skill in the art recognizes that numerous flight tests, simulations, and/or analysis for many different combinations of configuration, speed, and altitude, and set deflection of control surfaces to produce the ideal roll using the novel machine and process embodied herein to control roll of an aircraft may be flown to produce plots such as shown in FIG. 4. Without reproducing the results in this application of the flight tests, simulations, and/or analysis completed, the trends of their results are represented by FIG. 4. What is notable is that, with the machine and process of the novel flight control system embodiments described herein, flight test roll rate trends across the many conditions consistently result in almost no spread of values that deviate from the ideal roll rate, as represented in FIG. 4.

In addition to the ideal roll rate shown in FIG. 3, FIG. 4 shows representations of actual results of roll rate of a transport aircraft similar to vehicle 100 shown in FIGS. 1 and 2 rotating about axis X in a given configuration at a given speed and altitude, and with a set deflection of control surfaces to produce the ideal roll rate using novel machine and process embodiments described herein to control roll of the aircraft. Distinct from FIG. 3, in FIG. 4 a bold line shows variances in actual roll rate from the ideal for a maximum operational Ixx condition, and a dashed line shows variances in actual roll performance from the ideal for a minimum operational Ixx condition, when using the novel machine and process for rotation control embodied herein. Notably, in FIG. 4, as contrasted to FIG. 3 for currently available flight control systems, the actual roll rate has almost no variations from the ideal roll rate.

Hence, comparing FIG. 4 to FIG. 3 shows a technological benefit, provided by the novel machine and process embodiments described herein, of more precise roll rate control for a vehicle that significantly reduces current overshoots of actual roll rate from an intended/ideal response from a particular control input by a flight control system. The novel machine and process embodiments described herein provide additional technical benefits as well.

Figure 5:
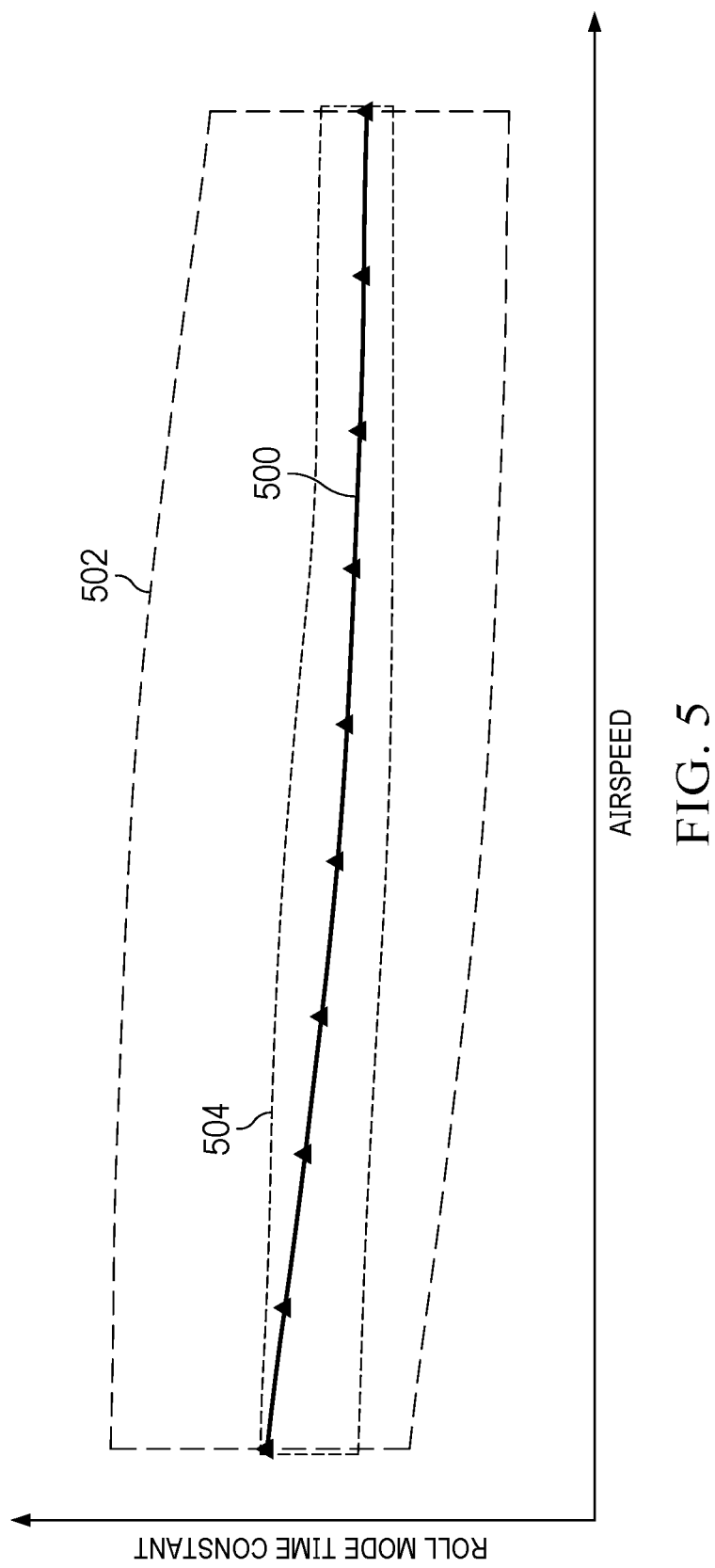
FIG. 5 is an illustration a graph of roll mode time constant versus airspeed in accordance with an illustrative embodiment.

With reference to FIG. 5, an illustration of a graph of roll mode time constant versus airspeed is depicted in accordance with an illustrative embodiment. The novel machine and process embodiments described herein provide an additional technical benefit of improving stability and predictability in control of rotation about and axis of vehicle 100. FIG. 5 provides a representation of a target roll mode time constant 500, and analytical flight results for actual roll mode time constants when vehicle 100 was a transport aircraft.

Box 502 shows a range of deviations from target roll mode time constant 500 across a range of airspeeds for a transport category aircraft with a current flight control system. In contrast, box 504 shows a range of deviations from target roll mode time constant 500 across a range of airspeeds for the transport category aircraft using the novel machine and process to control rotation of vehicle 100 as disclosed herein. FIG. 5 indicates that the novel machine and process for rotation control described herein provide an additional technical benefit of improving stability and predictability in control of rotation about and axis of vehicle 100 by noticeably reducing actual deviations of roll mode time constant from target roll mode time constant 500.

FIG. 5 indicates that a novel machine and process for rotation control embodiment described herein improves consistency and precision of the vehicle 100 roll response across a roll inertia envelope, allowing for a more predictable first-order roll mode response shown by box 504 as compared to the more deviant first-order roll mode response shown for currently existing roll control systems. Normalizing (by tightening deviations 504 onto the design roll mode time constant 500) the response characteristic also allows for a resiliency in performance that may overcome more parameter uncertainty inputs into the control laws and rotation control system before handling qualities of vehicle rotation (and/or other affected performance modes) degrade to an unacceptable level.

By enhancing normalization of roll mode time constant performance, a novel machine and process for rotation control embodiment described herein also provide the technological improvement of increasing a robustness of FCE 116 to variances during operation of vehicle 100.

Further still, FIG. 5 is presented as indicative not only of normalization enhancement for the roll mode time constant performance shown, but as an example of enhancements across many measures of maneuverability and stability for vehicle 100 that may be provided by a novel machine and process for rotation control embodiment described herein over operation of vehicles operating today with currently existing roll control systems. Without limitation, other measures may include: improved piloted handling qualities, and a more predictable and normalized: roll acceleration, roll rate. and heading response. Pilot handling qualities improved may include: reduced Pilot Induced Oscillation (PIO) risk due to: improved disturbance rejection, requiring less pilot in the loop activity due to atmospheric upsets; reduced phase delay associated with rate saturation, specifically in a typical landing (a "high gain" situation at close to min Ixx values) configuration; reduced closed-loop phase delay associated with an optimized Ixx dependent notch filter selection for a fuel quantity dependent wing-bending flexible mode; reduced actuator saturation due to lower feed-forward gains at lower Ixx values with lower fuel loadings, improved turn entry and turn exit heading response. In other words, enhancing gain scheduling with the novel addition of Ixx updated in real time throughout operation of the vehicle allows for compliance to the toll mode time constant handing qualities requirements over the entire roll inertia range, at a precision that is unachievable in current flight control systems that lack the novel process and machine that incorporate Ixx gain scheduling as embodied herein.

Figure 6:
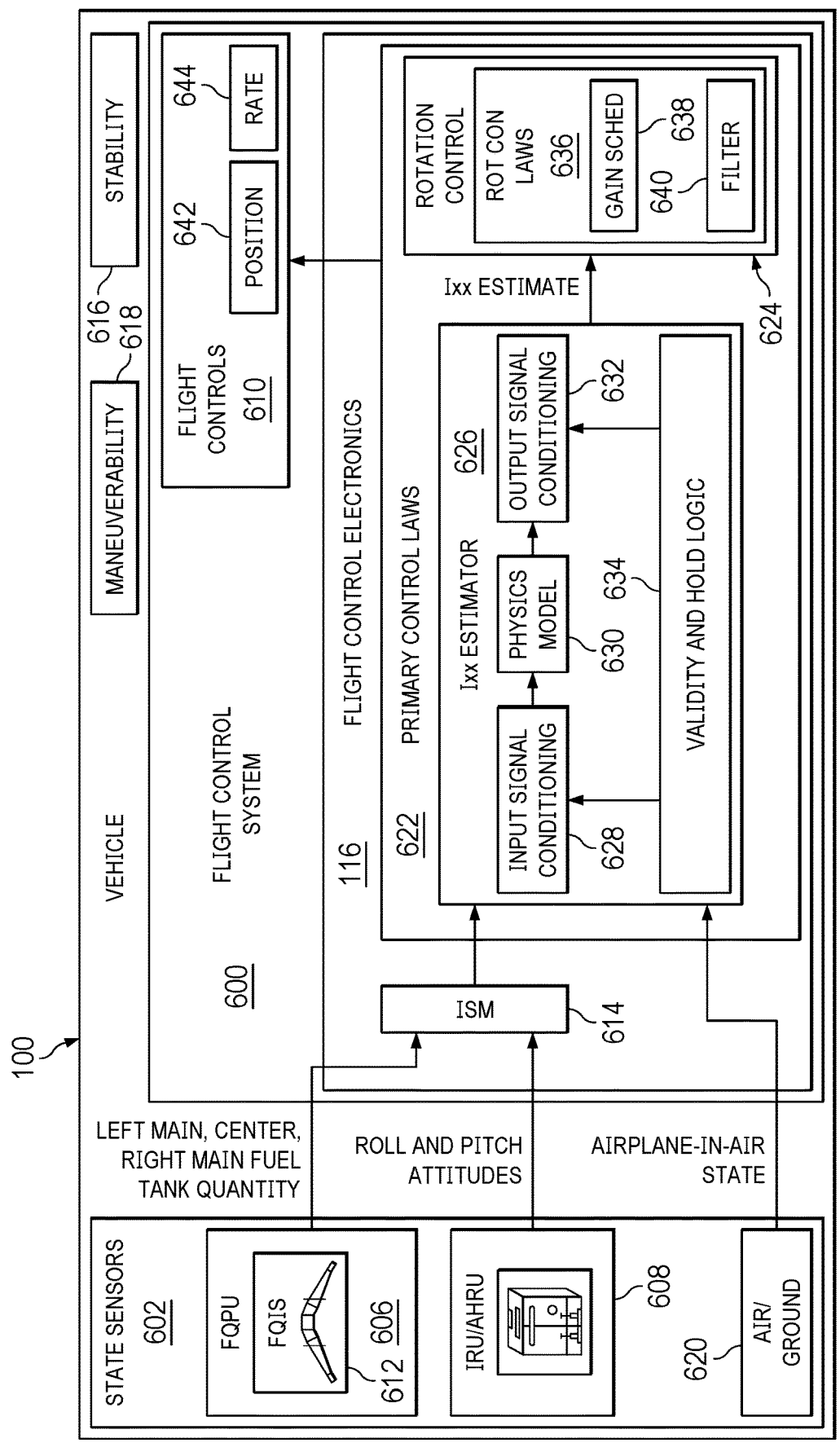
FIG. 6 is an illustration of a block diagram of a flight control system for a vehicle in accordance with an illustrative embodiment.

With reference next to FIG. 6, an illustration of a block diagram of a flight control system for a vehicle is depicted in accordance with an illustrative embodiment. Vehicle 100 is shown with flight control system 600 receiving inputs from state sensors 602. Without limitation, vehicle 100 of the embodiment illustrated in FIG. 6 may be an aerospace vehicle at least as depicted in FIGS. 1 and 2. Flight control system 600 of FIG. 6 may include flight controls 610 and Flight Control Electronics (FCE) 116, as shown in FIGS. 1 and 2. Flight controls 610 may include without limitation, physical surfaces and/or other devices affecting flow of over vehicle 100 and physical actuators therefor. Hence, without limitation, at least items 110-114 shown in FIG. 1 may be considered as part of flight controls 610 shown in FIG. 6.

Without limitation, flight controls 610 may include as well as devices for inputting commands to physical surfaces and/or other devices affecting flow of over vehicle 100 and physical actuators therefor.

State sensors 602 sense conditions affecting, and on, vehicle 100. As a non-limiting example, sensor systems 224-228 shown in FIG. 2 may be a part of fuel quantity indicating system FQIS 612 as part of fuel quantity processing unit 606 within state sensors 602. Sensor systems 224-228 shown in FIG. 2 may be considered as within fuel quantity indicating system FQIS 612. FQIS 612 may provide fuel quantity values from components, such as without limitation, components 200-204 shown in FIG. 2 for vehicle 100 as left, center, and right main fuel tanks, respectively to Flight Control Electronics (FCE) 116 through input signal management (ISM) 614 portion within FCE 116.

Similarly, inertial reference unit/attitude heading reference unit (IRU/AHRU) 608 may provide roll pitch and attitude information to FCE 116 through ISM 614. Air/ground sensor 620 may also provide information on a state of vehicle 100 to (inertia) Ixx estimator 626 within primary control laws 622 section of FCE 116. Without limitation, when vehicle 100 is an aircraft that can operate in a flow of air when not in contact with the ground, inertia computations may vary.

Figure 7:
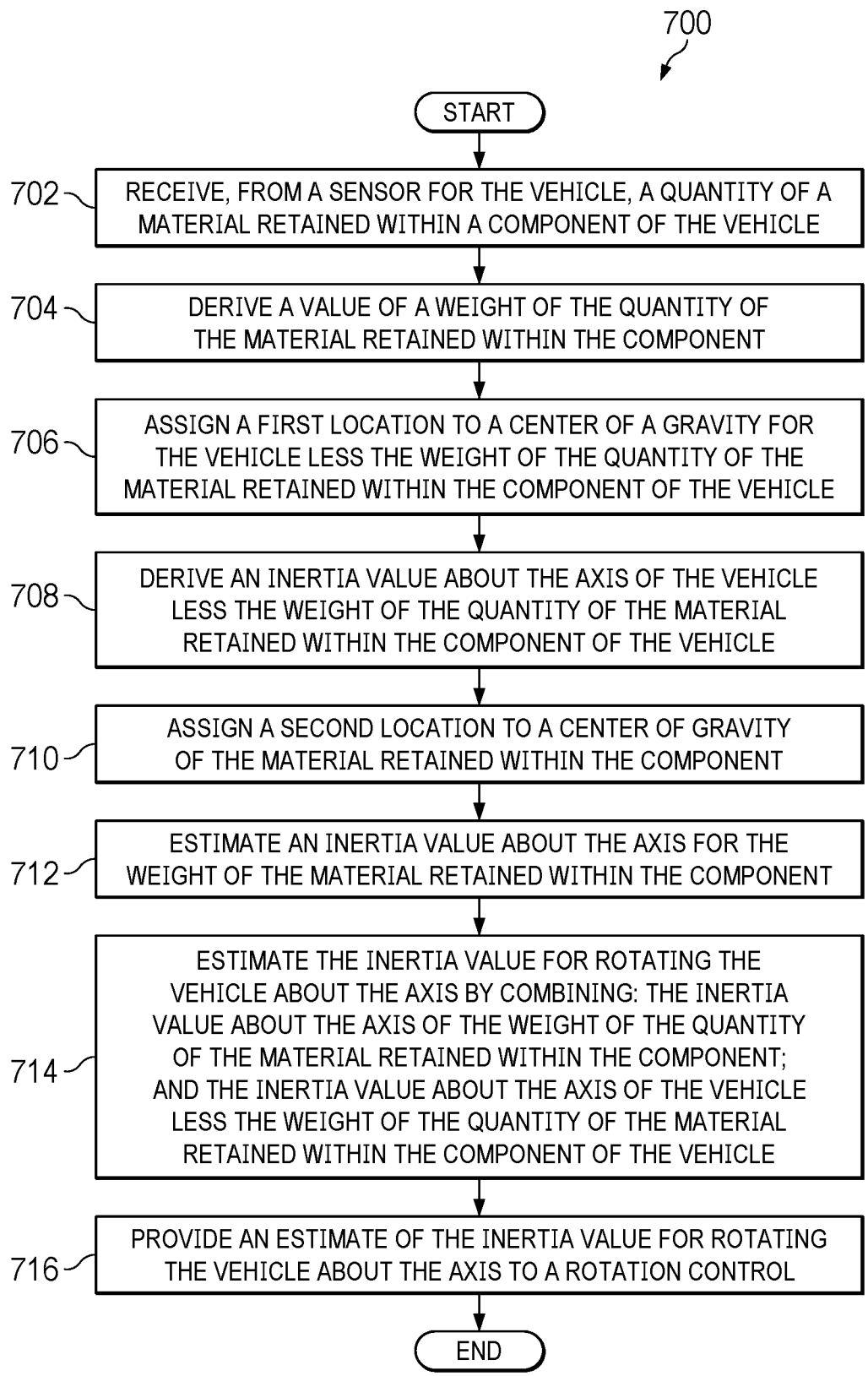
FIG. 7 is an illustration of a flow chart for a process for estimating an inertia for controlling rotation of a vehicle about an axis of the vehicle in accordance with an illustrative embodiment.

State sensors 602 may include other sensors that provide information to FCE 116 and other components on vehicle 100 about a state of vehicle 100 and/or a component thereon, and/or an environment that affects vehicle 100. Likewise, one of ordinary skill in the art recognizes that a common three-fuel tank system shown in FIGS. 2 and 7 is not limiting, and that different numbers and locations of components may have sensors for materials retained therein, which may be reported to ISM 614. Without limitation, additional components may be additional fuel tanks, munitions, and/or other payload items whose quantity may vary and/or be discharged/launched during operation of the vehicle. Additional fuel tanks may be mounted externally or internally, such as without limitation, within a horizontal stabilizer and/or tanks within the fuselage.

FCE 116 receives inputs to determine estimations for weights of components in, and payloads on, vehicle 100 and provides weight totals such as without limitation, zero-fuel weight (ZFW) for vehicle 100 to at least Ixx estimator 626 within primary control laws 622 of FCE 116. One of ordinary skill in the art understands ZFW to be a weight of vehicle 100 including payload, but excluding a weight of any fuel loaded onto vehicle 100.

Ixx estimator 626 may be a processing unit and/or network, and/or programming code module within FCE 116 that generates a value for Ixx 102 as shown in FIGS. 1 and 2. Ixx estimator 626 may represent hardware elements and/or a module of programming code within FCE 116. Without limitation, Ixx estimator 626 may include functional processing units and/or programming code such as, without limitation: input signal conditioning 628, physics model 630, output signal conditioning 632, and/or validity and hold logic 634.

Without limitation, for a transport aircraft roll inertia (Ixx 102 as shown in FIGS. 1 and 2) is dominated by the fuel quantity in the wings. The distribution of mass along the fuselage associated with changes due to payload and passengers may have a small effect on Ixx 102 relative to an effect on inertia Ixx 102 from fuel loads in, without limitation, compartments 102-106 as shown in FIG. 1, at least because most mass is so close to the axis of rotation and does not vary during operation of vehicle 100. Likewise, although landing gear and engine weights may also have an effect on Ixx, those weights do not vary and thus their effect on Ixx does not vary.

Input signal conditioning 628 may include programming that limits and/or selects inputs processed by Ixx estimator 626. Input signal conditioning 628 may include programming that limits and/or selects inputs from FQPU 606.

Physics model 630 is configured to use known and/or estimated mass properties of vehicle 100 and look-up tables therefor and translate sensed quantities of materials in components on vehicle 100 (such as without limitation, fuel quantities sensed by FQIS 612) into locations of center of mass (such as without limitation dowel pins 206-210 shown in FIG. 2) and into Ixx inertia values for each component (such as without limitation, components 206-210 shown in FIG. 2) and for vehicle 100 as a whole.

Physics model 630 is configured to compute a total (gross weight GW) Ixx inertia value for vehicle 100 using stored data on mass properties of a zero fuel weight (ZFW) of vehicle 100, along with Ixx inertia values for the vehicle at ZFW and at selected components locations of center of gravity, and payload mass data. Physics model 630 contains control law architecture used to derive Ixx Estimate output. Physics model 630 may apply the Parallel Axis Theorem in the inertia computations.

Thus, the physics model 630 architecture receives real-time inputs of weights (Wt) for a quantity of material retained in each component. Without limitation, LMainWt, CenterWt, and RMainWt are determined from sensed quantity indications respectively within components 204, 202, and 200 shown in FIG. 2, and are input to Ixx estimator 626 from state sensors 602. Those inputs are processed with lookup tables and physics model 630 derives values for LMainYcg, LMainZcg, CenterYcg, CenterZcg, RMainYcg, RMainZcg, distances which are representative of items 222, 220, 218, 216, 214, and 212 respectively. From those values, physics model 630 also derives inertia values for LMainIxx, CenterIxx, RMainIxx, which represent inertia values derived without limitation for each of the components 200-204 as shown, in FIG. 2 measured about axis X shown in FIG. 2. These inputs and derived values may be sensed and derived continuously in real-time throughout operation of vehicle 100.

ZFW, ZFWYcg, ZFWZcg may be stored and/or computed within flight control electronics 116 based upon inputs from state sensors 602 and other inputs (such as without limitation, payload data) and/or stored data for vehicle 100. Similar to distances 212-222 shown in FIG. 2, ZFWYcg and ZFWZcg (not shown in FIG. 2 to avoid clutter) represent a distance, along axis Y and along axis Z respectively, from body axis X to a location determined to be the center of gravity of vehicle 100 with no material retained within components 200-204.

Physics model 630 may apply a known ZFWIxx value for an inertia about axis X based upon a current gross weight of the aircraft less any loaded fuel. Gross Weight (GW) is computed as the sum of component weights LMainWt, CenterWt, and RMainWt and the ZFW. Variable weights of components 202-204 and materials retained therein are continuously summed along with ZFW in the rolling moment of inertia simplified control law architecture embodiment herein to provide a real time value for GW (gross weight). One of ordinary skill in the art understands GW (gross weight) to be a total weight of vehicle 100 that includes ZFW plus a total weight of all fuel loaded on vehicle 100.

The location of the center of gravity of the gross weight is continuously recomputed in real-time as quantity of material inside compartments 200-204 on vehicle 100 changes during operation of vehicle 100. On vehicles with capability to increase quantities of material retained by components, such as without limitation, aircraft that can refuel in flight, quantities/weight of materials in components may increase during operation of vehicle 100.

When payloads are unchanged during flight, ZFW and the location of the ZFW center of gravity will remain constant. However, vehicle 100 may also have a payload that may be discharged or diminished during operation of vehicle 100, such as without limitation, for jettisonable components or a droppable payload, ZFW and the center of gravity thereof may also be continuously updated.

From all the above, physics model 630 computes a location for the center of gravity of the GW as displaced distances from axis X along axis Y and along axis Z, GWYcg and GWZcg.

$$GWYcg=(ZFW \times ZFWYcg+RMainWt \times RMainYcg+LMainWt \times LMainYcg+CenterWt \times CenterYcg)/GW.$$

$$GWZcg=(ZFW \times ZFWZcg+RMainWt \times RMainZcg+LMainWt \times LMainZcg+CenterWt \times CenterZcg)/GW.$$

From these determinations, physics model 630 derives an Ixx inertia value for vehicle 100 at a current gross weight, GWIxx.

$$GWIxx=ZFWIxx+ZFW((GWYcg-ZFWYcg)^2+(GWZcg-ZFWZcg)^2)+RMainIxx+RMainWt((GWYcg-RMainYcg)^2+(GWZcg-RMainZcg)^2)+LMainIxx+LMainWt((GWYcg-LMainYcg)^2+(GWZcg-LMainZcg)^2)+CenterIxx+CenterWt((GWYcg-CenterYcg)^2+(GWZcg-CenterZcg)^2).$$

Hence, Ixx Estimate shown in FIG. 6 may represent any of GWIxx, ZFWIxx, and/or Ixx values of any component of vehicle 100 that may be used by rotation control 724 to control rotation of vehicle 100. As used herein, control rotation of vehicle 100 is understood by one of ordinary skill in the art to mean all maneuverability and/or stability factors regarding rotation to include at least: initiating, changing, terminating, preventing, or altering characteristics of rotation about an axis to include flutter and/or vibration characteristics of the vehicle and/or components about the axis.

Validity and hold logic 634 is configured to evaluate validity of variables received and generated by Ixx estimator 626. Validity and hold logic 634 is configured to hold discrete variables to supply to various downstream functions within Ixx estimator 626 and other functions/processors/components within vehicle 100.

Output signal conditioning 632 is configured to apply certain limits onto inertia estimates produced by Ixx estimator 626. Output signal conditioning 632 is configured to apply filters onto inertia estimates produced by Ixx estimator 626.

Hence, the Ixx Estimate shown in FIG. 6 as produced by Ixx estimator 626 within primary control laws 622 is a limited and filtered estimate of inertia about axis X estimate. Corresponding validity and hold logic discrete variables for downstream functions within Ixx estimator 626 produced by Ixx Estimator 626 may also be provided to other functions/processors/components within vehicle 100.

Rotation control 624 represents a subset of primary control laws 622 that receives at least Ixx Estimate and other values from Ixx Estimator 626. Rotation control 624 is configured to make vehicle roll at a rate that follows a designed ideal roll rate command profile, such as shown without limitation in FIGS. 3 and 5. Rotation control 624 may uses its own unique Ixx Estimate Processing and Selection Logic in rotation control laws 636. In the novel process and machine embodied at least by FIG. 6, gain schedule 638 and filter 640 receive and process Ixx Estimate to generate commands from rotation control 624 that determine a position 642 and rate 644 of movement of one of flight controls 610. Without limitation, a position of one of flight controls 610 in may be defined by an amount of deflection, extension, and/or retraction of a surface of the one of flight controls 610 from a reference setting therefor. Rate 644 of movement for one of flight controls 610 may be defined as a rate used to change from one position 642 to another position 642 for the one of flight controls 610. Incorporating Ixx Estimate into at least gain schedule 638 of rotation control 624 for command generation to flight controls 610 also provides the technological improvement of improving broken-loop stability margins and loop crossover frequencies within rotation control 624 to include at least a reduction of a rigid body phase delay associated with an optimized Ixx dependent notch filter selection for the fuel quantity dependent wing-bending flexible mode.

Rotation control 624 may also communicate with other functions and/or subsets that are not shown, to include at least: least lateral-directional structural modal suppression control laws, lateral-directional trim control laws, lateral-directional envelope protection control laws, and lateral-directional autopilot modes (not shown in the Figures) that rely on rotation control 624 to use appropriate inner-loop Ixx estimate processing and selection logic. Ixx Estimate and other Ixx estimator 626 generated values, in addition to several internal validity signals, may also be output to a Flight Data Recorder (FDR)(not shown) of vehicle 100.

Rotation control 624 provides commands that control activation rate 644 and position 642 of flight controls 610 to produce a desired rotation about axis X of vehicle 100. One of ordinary skill in the art recognizes that although not shown in FIG. 6, that primary control laws 622 may contain another processing unit and/or network, and/or programming code module not shown, such as without limitation, an Iyy estimator and an Izz estimator and rotation controls around axis Y and/or axis Z. Thus, although not shown, one of ordinary skill in the art recognizes that primary control laws 622 may also have estimators for Iyy and Izz inertias as well. Hence, while one of ordinary skill in the art understands that similar simplified illustrations may be provided for rotation control about axis Y and/or axis Z, FIG. 6 provides a simplified block diagram for rotation control about axis X of vehicle 100.

Features shown in FIG. 6 may be configured to operate continuously and in real-time as vehicle 100 is in operation. Hence, state sensors 602 provide real-time values continuously updated throughout operation of vehicle 100 to flight control system 600 that operates FCE 116 to generate a continuously updated rotation control 624 output that directs operation of flight controls 610 to produce desired and stability 616 and maneuverability 618 performance characteristics of vehicle 100.

The inertia values generated in Ixx Estimator 626 can be used to control rotation of vehicle 100 more precisely, as at least shown above, than current systems on vehicles are able to control rotation. Controlling rotation includes initiating, terminating, preventing, and/or controlling parameters of a rotation as it is occurring.

The novel machine and process that apply control law architecture incorporating rolling moments of inertia that vary and are continuously updating in real-time during operation of vehicle 100 produces the technical improvement of a more precise control of rotation for vehicle 100 as shown above in FIGS. 3-6. With the improved precision of rotation control provided by the novel process and machine embodied herein, to achieve a desired/ideal rotation rate in actual flight, undesired deviations from a commanded position 642 and rate 644 for movements of flight controls 710 and resultant rotation rate variances, such as a non-limiting example 1-2 degrees per second of roll rate, common in current flight control systems can be avoided. Thus, with actual roll rates resulting from flight control inputs not exceeding design rates, anticipated loads on the structures of vehicle 100 may be reduced by over 1.2 percent. When a design target roll rate can be reduced by 3 degrees per second, some wing bending moment loading may be reduced by 2 percent. One of ordinary skill in the art recognizes that reduced load requirements for a structure allow for reduced strength, size and/or weight of the structure.

Eliminating undershooting variances provides technical benefits as well. When variances from a desired roll rate produce an actual roll rate below ideal roll rate, a higher design roll rate may be required to ensure that actual roll rate does not fall below an ideal value. Thus, at least because the novel machine and process that apply control law architecture incorporating rolling moments of inertia that vary and are continuously updating in real-time during operation of vehicle 100 produce the technical benefit of precise roll rate control as shown by FIG. 4 as compared to FIG. 3, the design roll rate may be the ideal roll rate, and the need to use a higher design roll rate is eliminated. In other words, the novel machine and process that apply control law architecture incorporating rolling moments of inertia that vary and are continuously updating in real-time during operation of vehicle 100 produce the technical benefit of reducing overshoots an uncertainties from a nominal roll rate command limit and facilitate a reduction in a roll rate limit margin required in design and production of the vehicle.

A lower roll rate results in reduced anticipated loads upon a structure, and reduced required strength, size, and/or weight requirements for the structure. Reduced strength, size, and/or weight requirements for structures of a vehicle can produce improved performance capabilities of the vehicle. As a non-limiting example, when vehicle 100 is an aerospace vehicle, lower weight and size of structural components can reduce drag values and/or fuel consumption for the aerospace vehicle. One of ordinary skill in the art recognizes that many other performance characteristics and manufacturing benefits may be provide by reduced strength, size, and/or weight requirements for structures of an aerospace vehicle.

Ixx estimator 626 is thus configured to derive in real-time and continuously update a value of GWIxx (inertia about axis X for vehicle 100 at full gross weight) that can be used as input Ixx Estimate to Rotation Control 624 shown in FIG. 6. Inertia values for ZFW of vehicle 100 and of each component 200-204 are combined to produce GWIxx. Ixx 102 in FIG. 1 and FIG. 2 may be considered illustrative of GWIxx. Likewise, Ixx 102 in FIG. 1 and FIG. 2 may also be considered illustrative of Ixx Estimate. Similarly, when vehicle 100 is considered as being unfueled (no material retained within components 200-204) Ixx 102 may also be illustrative of ZFWIxx.

Turning next to FIG. 7, an illustration of a flow chart for a process for estimating an inertia for controlling rotation of a vehicle about an axis of the vehicle depicted in accordance with an illustrative embodiment. In particular, process 100 for estimating an inertia for controlling rotation of a vehicle about an axis of the vehicle may be without limitation, for vehicle 100 as shown at least in FIG. 1 and related Figures above. Process 700 of FIG. 7 can be implemented in hardware, software, or both. When implemented in software, the process can take the form of program code that is run by one of more processor units located in one or more hardware devices in one or more computer systems for vehicle 100. Without limitation, the one or more computer systems for vehicle 100 may be a part of or in communication with flight control system 600 at least as shown above in FIG. 6. For example, the process can be implemented using FCE 116 as shown and described at least in FIG. 1 and FIG. 6 above.

Process 700 may begin by receiving, from a sensor for the vehicle, a quantity of a material retained within a component of the vehicle (operation 702). Process 700 may continue by: deriving a value of a weight of the quantity of the material retained within the component (operation 704); assigning a first location to a center of a gravity for the vehicle less the weight of the quantity of the material retained within the component of the vehicle (operation 706); deriving an inertia value about the axis of the vehicle less the weight of the quantity of the material retained within the component of the vehicle (operation 708); assigning a second location to a center of gravity of the material retained within the component (operation 710); estimating an inertia value about the axis for the weight of the material retained within the component (operation 712); and estimating the inertia value for rotating the vehicle about the axis by combining: the inertia value about the axis of the weight of the quantity of the material retained within the component, and the inertia value about the axis of the vehicle less the weight of the quantity of the material retained within the component of the vehicle (operation 714). Process 100 may conclude by providing an estimate of the inertia value for rotating the vehicle about the axis to a rotation control (operation 716).

Figure 8:
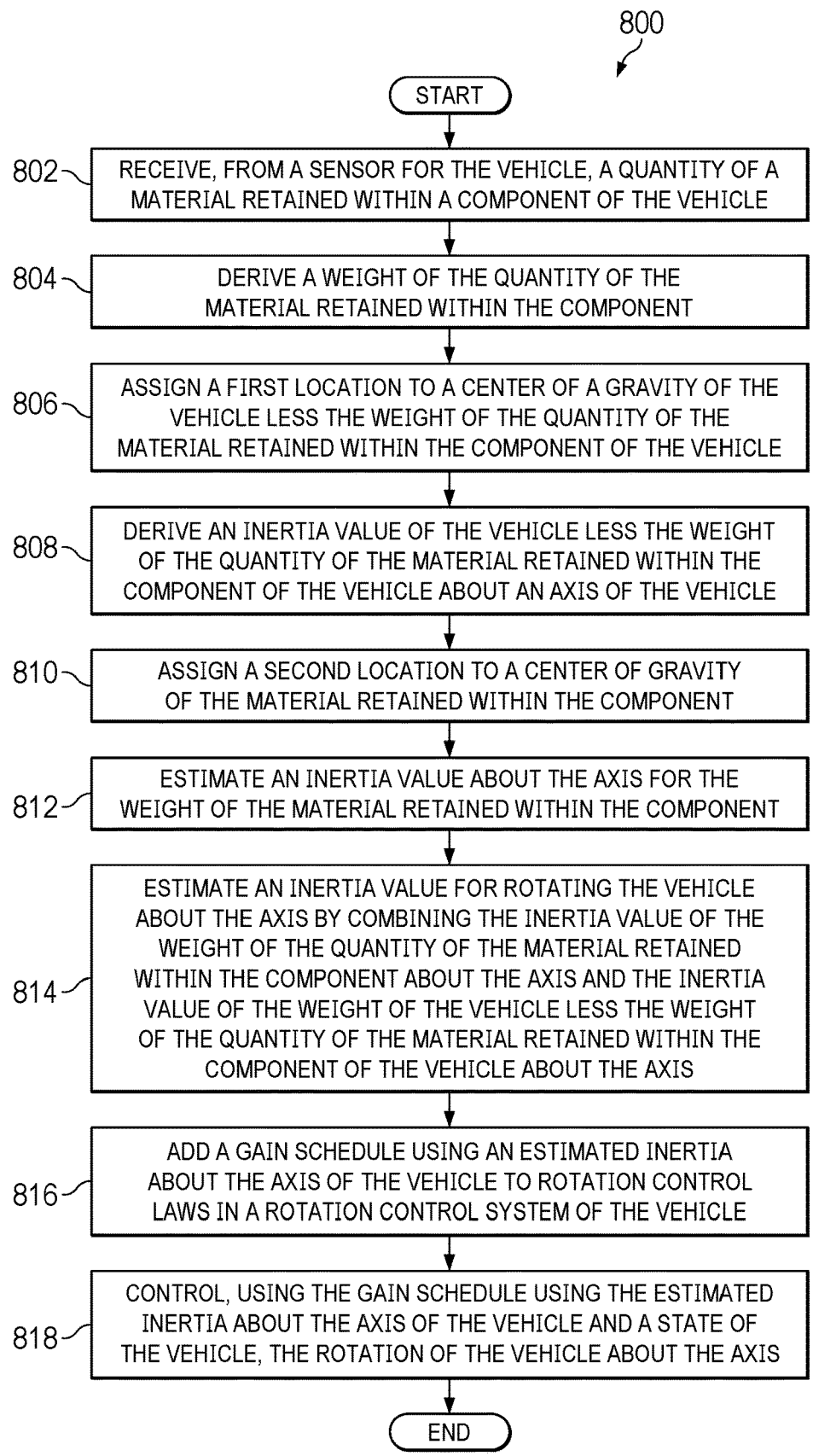
FIG. 8 is an illustration of a flow chart for a process for controlling rotation of a vehicle about an axis of the vehicle in accordance with an illustrative embodiment.

Turning next to FIG. 8, an illustration of a flowchart of a process controlling a rotation of a vehicle is depicted in accordance with an illustrative embodiment. In particular, process 800 for controlling rotation of a vehicle about an axis of the vehicle may be without limitation, for vehicle 100 as shown at least in FIG. 1 and related Figures above. Process 800 of FIG. 8 can be implemented in hardware, software, or both. When implemented in software, the process can take the form of program code that is run by one of more processor units located in one or more hardware devices in one or more computer systems for vehicle 100. Without limitation, the one or more computer systems for vehicle 100 may be a part of or in communication with flight control system 600 at least as shown above in FIG. 6. For example, the process can be implemented using FCE 86 as shown and described at least in FIG. 1 and FIG. 6 above.

Process 800 may begin by receiving, from a sensor for the vehicle, a quantity of a material retained within a component of the vehicle (operation 802). Process 800 may continue by: deriving a weight of the quantity of the material retained within the component (operation 804); assigning a first location to a center of a gravity of the vehicle less the weight of the quantity of the material retained within the component of the vehicle (operation 806); deriving an inertia value of the vehicle less the weight of the quantity of the material retained within the component of the vehicle about an axis of the vehicle (operation 808); assigning a second location to a center of gravity of the material retained within the component (operation 810); estimating an inertia value about the axis for the weight of the material retained within the component (operation 812); estimating an inertia value for rotating the vehicle about the axis by combining the inertia value of the weight of the quantity of the material retained within the component about the axis and the inertia value of the weight of the vehicle less the weight of the quantity of the material retained within the component of the vehicle about the axis (operation 814); and adding a gain schedule using an estimated inertia about the axis of the vehicle to rotation control laws in a rotation control system of the vehicle (operation 816). Process 800 may conclude by controlling, using the gain schedule using the estimated inertia about the axis of the vehicle and a state of the vehicle, the rotation of the vehicle about the axis (operation 818).

The flowcharts and block diagrams in the different depicted embodiments illustrate the architecture, functionality, and operation of some possible implementations of machine and/or process in an illustrative embodiment. In this regard, each block in the flowcharts or block diagrams can represent at least one of a module, a segment, a function, or a portion of an operation or step.

As a non-limiting example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 9:
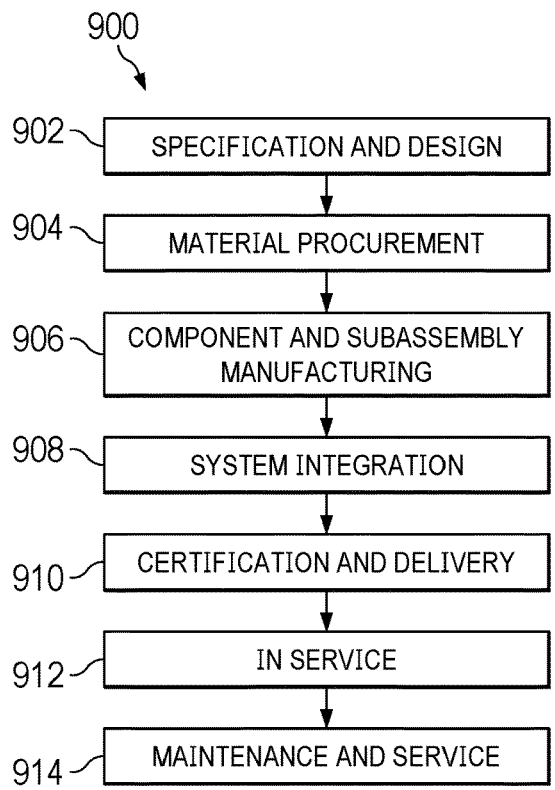
FIG. 9 is an illustration of an aircraft manufacturing and service method in accordance with an illustrative embodiment.
Figure 10:
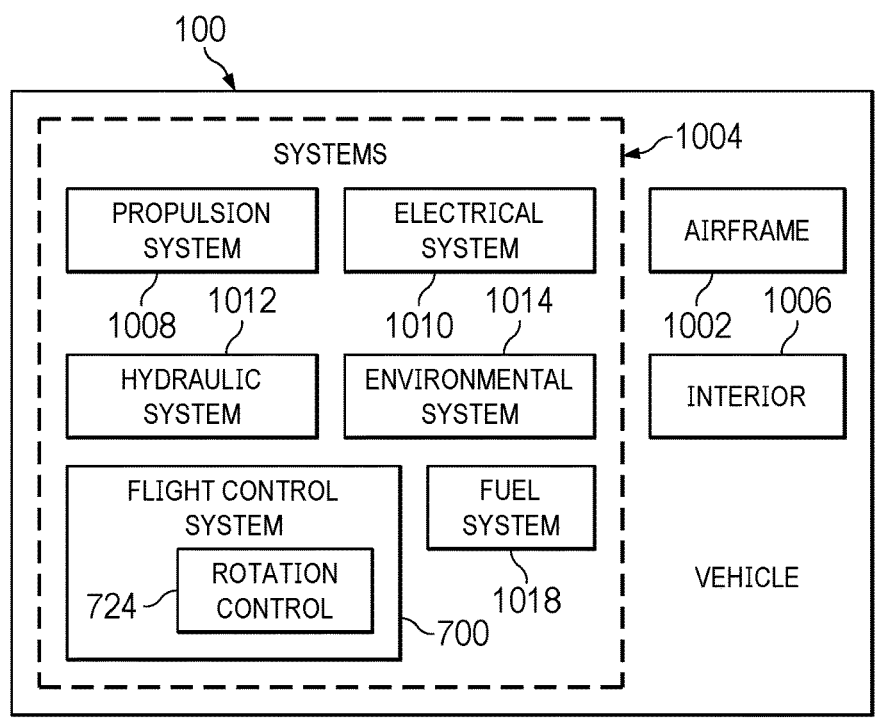
FIG. 10 is an illustration of a block diagram of an aircraft in which an illustrative embodiment may be implemented.

Illustrative embodiments of the disclosure may be described in the context of vehicle manufacturing and service method 900 as shown in FIG. 9 and vehicle 100 as shown in FIG. 10, which may be representative without limitation, of vehicle 100 as shown above at least in FIG. 1 and related Figures.

Turning first to FIG. 9, an illustration of a vehicle manufacturing and service method is depicted in accordance with an illustrative embodiment. During pre-production, vehicle manufacturing and service method 900 may include specification and design 902 of vehicle 100 in FIG. 10 and material procurement 904. One of ordinary skill in the art recognizes that the vehicle of FIG. 9 may be without limitation, vehicle 100 of FIG. 1 and related Figures above. Without limitation, FIG. 9 may also apply for other vehicles, such as an aquatic vehicle, an aerospace vehicle, or a terrain vehicle.

During production, component and subassembly manufacturing 906 and system integration 908 of vehicle 100 in FIG. 10 takes place. Thereafter, vehicle 100 in FIG. 10 can go through certification and delivery 910 in order to be placed in service 912. While in service 912 by a customer, vehicle 100 in FIG. 10 is scheduled for routine maintenance and service 914, which may include modification, reconfiguration, refurbishment, and other maintenance or service.

Each of the processes of vehicle manufacturing and service method 900 may be performed or carried out by a system integrator, a third party, an operator, or some combination thereof. In these examples, the operator may be a customer. For the purposes of this description, a system integrator may include, without limitation, any number of vehicle manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of a vehicle is depicted in which an illustrative embodiment may be implemented. In this example, vehicle 100 is produced by vehicle manufacturing and service method 900 in FIG. 9 and may include airframe 1002 with plurality of systems 1004 and interior 1006. In vehicle 100, airframe 1002 is representative of vehicle 100 shown in FIG. 1 as an aircraft, but is also representative of a structural frame for any vehicle. Examples of systems 1004 may include without limitation, one or more of propulsion system 1008, electrical system 1010, hydraulic system 1012, and environmental system 1014. Any number of other systems may be included. Although an aerospace example is shown, different illustrative embodiments may be applied to other industries, such as without limitation, the marine or automotive industry.

Apparatuses and methods embodied herein may be employed during at least one of the stages of vehicle manufacturing and service method 900 in FIG. 9.

In one illustrative example, components or subassemblies produced in component and subassembly manufacturing 906 in FIG. 9 can be fabricated or manufactured in a manner similar to components or subassemblies produced while vehicle 100 is in service 912 in FIG. 9. As yet another example, one or more apparatus embodiments, method embodiments, or a combination thereof can be utilized during production stages, such as component and subassembly manufacturing 906 and system integration 908 in FIG. 9. One or more apparatus embodiments, method embodiments, or a combination thereof may be utilized while vehicle 100 is in service 912, during maintenance and service 914 in FIG. 9, or both. The use of a number of the different illustrative embodiments may substantially expedite the assembly of vehicle 100, reduce the cost of vehicle 100, or both expedite the assembly of vehicle 100 and reduce the cost of vehicle 100 as shown in FIG. 10, FIG. 1, and related Figures above.

For example, FCE 116 can be manufactured and integrated during at least one of component and subassembly manufacturing 906, system integration 908, or maintenance and service 914. For example, the IFCE can be implemented during the manufacturing of vehicle 100. In other illustrative examples, FCE 116 can be implemented, retrofit, added, upgraded, or maintained during maintenance and service 914, which can include modification, reconfiguration, refurbishment, and other maintenance or service for vehicle 100. One of ordinary skill in the art recognizes that Ixx estimator 626 may be a novel enhancement that may be retrofitted to upgrade some currently existing FCE 116 that lack the novel Ixx estimator 626 feature and its ability to inject Ixx Estimate into current versions of rotational control laws that may exist for vehicles that currently lack the novel embodiment described herein.

Some features of the illustrative examples are described in the following clauses. These clauses are examples of features not intended to limit other illustrative examples.

Clause 1: A process for estimating an inertia for controlling rotation of a vehicle about an axis of the vehicle, the process comprising:

receiving, from a sensor for the vehicle, a quantity of a material retained within a component of the vehicle;
deriving a value of a weight of the quantity of the material retained within the component;
assigning a first location to a center of a gravity for the vehicle less the weight of the quantity of the material retained within the component of the vehicle;
deriving an inertia value about the axis of the vehicle less the weight of the quantity of the material retained within the component of the vehicle;
assigning a second location to a center of gravity of the material retained within the component;
estimating an inertia value about the axis for the weight of the material retained within the component;
estimating the inertia value for rotating the vehicle about the axis by combining:
the inertia value about the axis of the weight of the quantity of the material retained within the component; and
the inertia value about the axis of the vehicle less the weight of the quantity of the material retained within the component of the vehicle; and
providing an estimate of the inertia value for rotating the vehicle about the axis to a rotation control.

Clause 2. The process of clause 1, wherein the material retained within the component of the vehicle is a fluid.

Clause 3. The process of clause 1, wherein the quantity and the weight of the material retained within the component of the vehicle varies during operation of the vehicle.

Clause 4. The process of clause 1, wherein the axis is an X axis of the vehicle.

Clause 5. The process of clause 1, wherein the first location is defined by a distance from an X axis of the vehicle at a distance along a Y axis of the vehicle and at a distance along a Z axis of the vehicle.

Clause 6. The process of clause 1, further comprising assigning, using the quantity of the material sensed by the sensor, a current weight of the material retained within the component.

Clause 7. The process of clause 1, wherein the component is a fuel tank in the vehicle.

Clause 8. The process of clause 1, further comprising:
the vehicle comprising the rotation control comprising rotation control laws; and
adding a gain schedule using an estimate of inertia about an X axis of the vehicle to the rotation control laws.

Clause 9. The process of clause 1, further comprising:
the vehicle comprising a rotation control comprising rotation control laws; and
adding a filter using an estimate of inertia about an X axis of the vehicle to the rotation control laws.

Clause 10. The process of clause 1, wherein the material is fuel for the vehicle.

Clause 11. The process of clause 1, wherein the vehicle is an aircraft.

Clause 12. A process for controlling a rotation of a vehicle, the process comprising:
receiving, from a sensor for the vehicle, a quantity of a material retained within a component of the vehicle;
deriving a weight of the quantity of the material retained within the component;
assigning a first location to a center of a gravity of the vehicle less the weight of the quantity of the material retained within the component of the vehicle;
deriving an inertia value of the vehicle less the weight of the quantity of the material retained within the component of the vehicle about an axis of the vehicle;
assigning a second location to a center of gravity of the material retained within the component;
estimating an inertia value about the axis for the weight of the material retained within the component;
estimating an inertia value for rotating the vehicle about the axis by combining the inertia value of the weight of the quantity of the material retained within the component about the axis and the inertia value of the weight of the vehicle less the weight of the quantity of the material retained within the component of the vehicle about the axis;
adding a gain schedule using an estimated inertia about the axis of the vehicle to rotation control laws in a rotation control system of the vehicle; and
controlling, using the gain schedule using the estimated inertia about the axis of the vehicle and a state of the vehicle, the rotation of the vehicle about the axis.

Clause 13. The process of clause 12, wherein the material retained within the component of the vehicle is a fluid.

Clause 14. The process of clause 12, wherein the axis is an X axis of the vehicle.

Clause 15. The process of clause 12, wherein the first location is defined by a distance from an X axis of the vehicle at a distance along a Y axis of the vehicle and at a distance along a Z axis of the vehicle.

Clause 16. The process of clause 12, further comprising assigning, using the quantity of the material sensed by the sensor, a current weight of the material retained within the component.

Clause 17. The process of clause 12, wherein the component is a fuel tank in the vehicle.

Clause 18. The process of clause 12, further comprising adding a filter using inertia about an X axis of the vehicle to the rotation control laws.

Clause 19. The process of clause 12, wherein a quantity and the weight of the material retained within the component of the vehicle varies during operation of the vehicle.

Clause 20. A machine, configured to control a rotation of a vehicle about an axis of the vehicle, that comprises:
a rotation control that comprises rotation control laws configured to control the rotation of the vehicle about the axis of the vehicle;
a sensor system configured to:
detect a quantity of a material in a component of the vehicle configured to retain the material;
transmit the quantity of the material in the component to the rotation control;
sense a state of the vehicle;
transmit the state of the vehicle to the rotation control;
flight control electronics configured to:
derive a value of a weight of the material in the component;
estimate an inertia value of the material in the component about the axis of the vehicle;
generate an estimated inertia value for rotating the vehicle about the axis based upon a combination of the inertia value of the weight of the quantity of the material retained within the component about the axis and the inertia value of the weight of the vehicle less the weight of the quantity of the material retained within the component of the vehicle about the axis;
input the estimated inertia value about the axis of the vehicle into a gain schedule for rotation control laws in the rotation control of the vehicle; and control, based upon the gain schedule and the estimated inertia value about the axis of the vehicle, a rotation of the vehicle about the axis.

Thus, the illustrative embodiments provide a technological improvement through a process and a machine that determine an inertia value about an axis of a vehicle, apply the inertia value to modify gain schedules and filters for commands to controls for the vehicle, and thereby increase precision control of a position and a rate of movement of control surfaces that generate a desired rotation performance of the vehicle. Hence, precision in control of rotation of the vehicle about the axis of the vehicle is improved to a magnitude that allows the technological improvement of reducing at least a required strength, size, and/or weight of structures of the vehicle to a degree that performance characteristics of the vehicle are improved to provide noticeable increases in at least maneuverability, stability, and/or efficiency of controls of the vehicle and/or the vehicle as a whole. Thereby, the novel process and machine embodiments described herein also produce cost reductions for operation and production of the vehicle, as well as increased lifespan and reliability of the vehicle.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The illustrations above are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

What is claimed is:

1. A process for estimating an inertia for controlling rotation of a vehicle about an axis of the vehicle, the process comprising:
receiving, from a sensor for the vehicle, a quantity of a material retained within a component of the vehicle;
deriving a value of a weight of the quantity of the material retained within the component;
assigning a first location to a center of a gravity for the vehicle less the weight of the quantity of the material retained within the component of the vehicle;
deriving an inertia value about the axis of the vehicle less the weight of the quantity of the material retained within the component of the vehicle;
assigning a second location to a center of gravity of the material retained within the component;
estimating an inertia value about the axis for the weight of the material retained within the component;
estimating the inertia value for rotating the vehicle about the axis by combining:
the inertia value about the axis of the weight of the quantity of the material retained within the component; and
the inertia value about the axis of the vehicle less the weight of the quantity of the material retained within the component of the vehicle;
providing an estimate of the inertia value for rotating the vehicle about the axis to a rotation control; and
controlling, using the estimate of the inertia value, rotating the vehicle.

2. The process of claim 1, wherein the material retained within the component of the vehicle is a fluid.

3. The process of claim 1, wherein the quantity and the weight of the material retained within the component of the vehicle varies during operation of the vehicle.

4. The process of claim 1, wherein the axis is an X axis of the vehicle.

5. The process of claim 1, wherein the first location is defined by a distance from an X axis of the vehicle at a distance along a Y axis of the vehicle and at a distance along a Z axis of the vehicle.

6. The process of claim 1, further comprising assigning, using the quantity of the material sensed by the sensor, a current weight of the material retained within the component.

7. The process of claim 1, wherein the component is a fuel tank in the vehicle.

8. The process of claim 1, further comprising:
the vehicle comprising the rotation control comprising rotation control laws; and
adding a gain schedule using an estimate of inertia about an X axis of the vehicle to the rotation control laws.

9. The process of claim 1, further comprising:
the vehicle comprising a rotation control comprising rotation control laws; and
adding a filter using an estimate of inertia about an X axis of the vehicle to the rotation control laws.

10. The process of claim 1, wherein the material is fuel for the vehicle.

11. The process of claim 1, wherein the vehicle is an aircraft.

12. A process for controlling a rotation of a vehicle, the process comprising:
receiving, from a sensor for the vehicle, a quantity of a material retained within a component of the vehicle;
deriving a weight of the quantity of the material retained within the component;
assigning a first location to a center of a gravity of the vehicle less the weight of the quantity of the material retained within the component of the vehicle;
deriving an inertia value of the vehicle less the weight of the quantity of the material retained within the component of the vehicle about an axis of the vehicle;
assigning a second location to a center of gravity of the material retained within the component;

estimating an inertia value about the axis for the weight of the material retained within the component;

estimating an inertia value for rotating the vehicle about the axis by combining the inertia value of the weight of the quantity of the material retained within the component about the axis and the inertia value of the weight of the vehicle less the weight of the quantity of the material retained within the component of the vehicle about the axis;

adding a gain schedule using an estimated inertia about the axis of the vehicle to rotation control laws in a rotation control system of the vehicle; and controlling, using the gain schedule using the estimated inertia about the axis of the vehicle and a state of the vehicle, the rotation of the vehicle about the axis.

13. The process of claim 12, wherein the material retained within the component of the vehicle is a fluid.

14. The process of claim 12, wherein the axis is an X axis of the vehicle.

15. The process of claim 12, wherein the first location is defined by a distance from an X axis of the vehicle at a distance along a Y axis of the vehicle and at a distance along a Z axis of the vehicle.

16. The process of claim 12, further comprising assigning, using the quantity of the material sensed by the sensor, a current weight of the material retained within the component.

17. The process of claim 12, wherein the component is a fuel tank in the vehicle.

18. The process of claim 12, further comprising adding a filter using inertia about an X axis of the vehicle to the rotation control laws.

19. The process of claim 12, wherein a quantity and the weight of the material retained within the component of the vehicle varies during operation of the vehicle.

20. A machine, configured to control a rotation of a vehicle about an axis of the vehicle, that comprises:

a rotation control that comprises rotation control laws configured to control the rotation of the vehicle about the axis of the vehicle;

a sensor system configured to:
  detect a quantity of a material in a component of the vehicle configured to retain the material;
  transmit the quantity of the material in the component to the rotation control;
  sense a state of the vehicle; and
  transmit the state of the vehicle to the rotation control;

flight control electronics configured to:
  derive a value of a weight of the material in the component;
  estimate an inertia value of the material in the component about the axis of the vehicle;
  generate an estimated inertia value for rotating the vehicle about the axis based upon a combination of the inertia value of the weight of the quantity of the material retained within the component about the axis and the inertia value of the weight of the vehicle less the weight of the quantity of the material retained within the component of the vehicle about the axis;
  input the estimated inertia value about the axis of the vehicle into a gain schedule for rotation control laws in the rotation control of the vehicle; and
  control, based upon the gain schedule and the estimated inertia value about the axis of the vehicle, a rotation of the vehicle about the axis.

* * * * *